United States Patent [19]

McMullin

[11] Patent Number: 4,910,440
[45] Date of Patent: Mar. 20, 1990

[54] ELECTRONIC CONSTANT POWER BALLAST FOR ARC LAMPS

[75] Inventor: Peter G. McMullin, Toronto, Canada

[73] Assignee: Jaskara Corp, Toronto, Canada

[21] Appl. No.: 265,517

[22] Filed: Nov. 1, 1988

[30] Foreign Application Priority Data

Nov. 6, 1987 [CA] Canada ................................. 551271

[51] Int. Cl.$^4$ ............................................ H05B 37/02
[52] U.S. Cl. ................................ 315/307; 315/209 T; 315/DIG. 7
[58] Field of Search ............... 315/209 R, 209 T, 225, 315/291, 307, DIG. 7

[56] References Cited

U.S. PATENT DOCUMENTS

4,331,914  5/1982  Huber .............................. 315/291 X

Primary Examiner—Eugene R. Laroche
Assistant Examiner—Robert J. Pascal
Attorney, Agent, or Firm—Ridout & Maybee

[57] ABSTRACT

In a power supply for an arc lamp in which a power source feeds an inverter consisting of a bridge network of field effect transistors, the current to the inverter is controlled by a switching transistor in accordance with the voltage applied bridge network in such a way as to maintain a constant power level over a specified operating range. A master oscillator and associated divider circuits provide a clock for controlling the switching transistor and pulses for driving the field effect transistors of the inverter at a frequency which is a submultiple of the clock frequency.

7 Claims, 9 Drawing Sheets

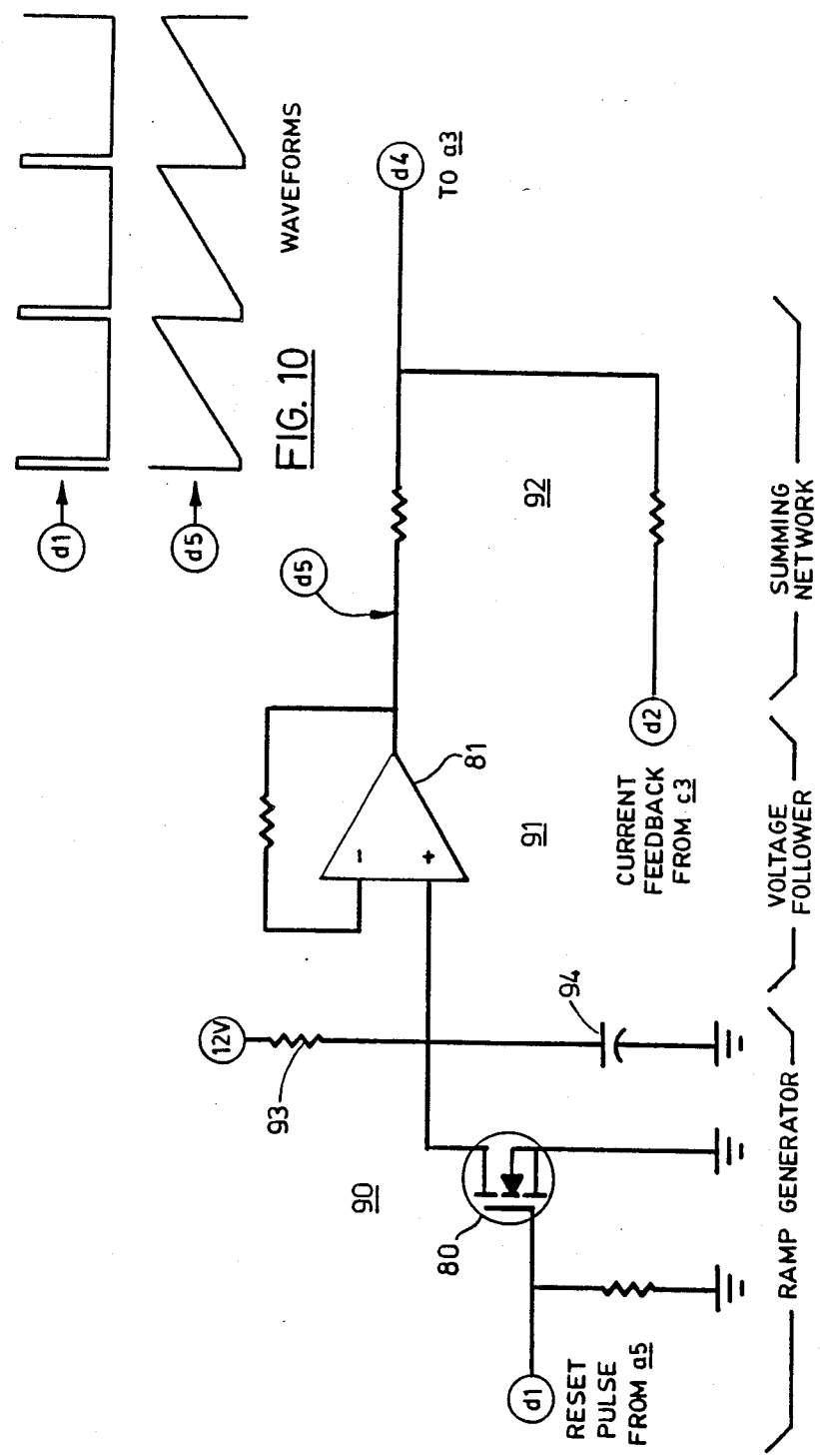

ELECTRONIC CONSTANT POWER BALLAST FOR ARC LAMPS

BACKGROUND OF THE INVENTION

This invention relates to a power supply for an arc lamp, and is particularly concerned with a power supply of the general type comprising a power source and an inverter. The arc lamp is typically a metal halide lamp of the type used for cinematographic and television lighting.

An arc lamp of this type is preferably driven by alternating square wave current so as to avoid modulation of the light output at the supply frequency as would occur if the current supply were sinusoidal. Attempts have been made to achieve a satisfactory square wave output for this purpose.

Canadian Patent No. 1185649 dated Apr. 16, 1985, in the name Lee Electric (Lighting) Limited, discloses a power supply for arc lamps which represents a notable advance over the prior art. The power supply is designed to deliver alternating square wave current for driving an arc lamp, but is more compact and more convenient to use than the power supplies previously used. The power supply essentially comprises a power source feeding an inverter from which the output current is derived, the power source being a constant current source comprising a rectifier, a capacitor, an inductor and a field effect transistor connected in series. The inverter is connected across the capacitor so that current supplied to the inverter is drawn through the field effect transistor. The constant current source is maintained by means of a chopper oscillator for controlling the conduction of the field effect transistor in response to the current drawn by the field effect transistor. The inverter comprises a bridge network of field effect transistors driven by a bridge oscillator to deliver the current output at the required output frequency.

While the power supply disclosed in the above Canadian patent is an improvement over the earlier power supplies, it also has shortcomings. One shortcoming is that the constant current source and the inverter are necessarily controlled by separate oscillators and in consequence the system cannot be truly synchronous. While the lack of synchronism in the system does not necessarily affect the light output adversely, it gives rise to noisy operation. Another shortcoming is that, since the power source is controlled by the chopper oscillator to give a constant current output it cannot provide a constant power output since the voltage is subject to variation. This is a disadvantage because variations in the power level give rise to variations in the quality and spectral distribution of the light output.

SUMMARY OF THE INVENTION

The present invention overcomes the above-mentioned disadvantages by providing a power supply which is synchronous and in which the current source is controlled so as to operate the arc lamp at a constant power level, thereby ensuring a constant quality of the light output over the operating range of voltage.

Accordingly, the invention provides a power supply for an arc lamp comprising a power source and an inverter, in which the power source comprises a rectifier, a capacitor, an inductor and a switching transistor connected in series, and the inverter comprises a bridge network of field effect transistors, the bridge network being in parallel with the capacitor so that current supplied to the inverter is drawn through the switching transistor. The bridge network is controlled by a timing circuit comprising a master clock, means for deriving from the master clock a sequence of square wave pulses at a first selected reference frequency, and means for deriving from said sequence of pulses a pair of complementary sequences of square wave pulses at a second selected reference frequency which is a submultiple of the first for driving the field effect transistors of the inverter selectively in pairs. The power source is controlled by a PWM circuit which is responsive both to current drawn by the switching transistor and voltage applied to the bridge network for controlling conduction of the switching transistor so as to maintain the output of the inverter at a substantially constant power level. This PWM circuit comprises a pulse generator controlled by the master clock for generating a sequence of control pulses at said first reference frequency, a first feedback circuit responsive to current drawn by the switching transistor for deriving a current-responsive first signal, a second feedback circuit responsive to voltage applied to the bridge network for deriving a voltage-responsive second signal, comparator means for comparing the first and second signals to derive a difference signal, means for gating said control pulses with the difference signal to derive PWM pluses at said first reference frequency, and control circuit means for controlling the conduction of the switching transistor in a PWM mode in accordance with the derivation of the PWM pulses.

Instead of a second feedback circuit to derive a signal which is directly responsive to the voltage applied to the bridge circuit, a voltage ramp generator may be employed to derive an artificial amp, the ramp waveform increasing as the PWM time and thus providing a voltage signal which corresponds to the voltage applied to the bridge.

BRIEF DESCRIPTION OF THE DRAWINGS

Two embodiments of the invention will now be described, by way of example, with reference to the accompanying drawings. In the drawings:

FIG. 9 is a wiring diagram of the PWM reference generator corresponding to the block 13 in FIG. 1, in the second embodiment of the invention; and FIG. 10 is a waveform diagram to be read in conjunction with FIG. 9.

DESCRIPTION OF THE PREFERRED EMBODIMENTS

Figure 1:
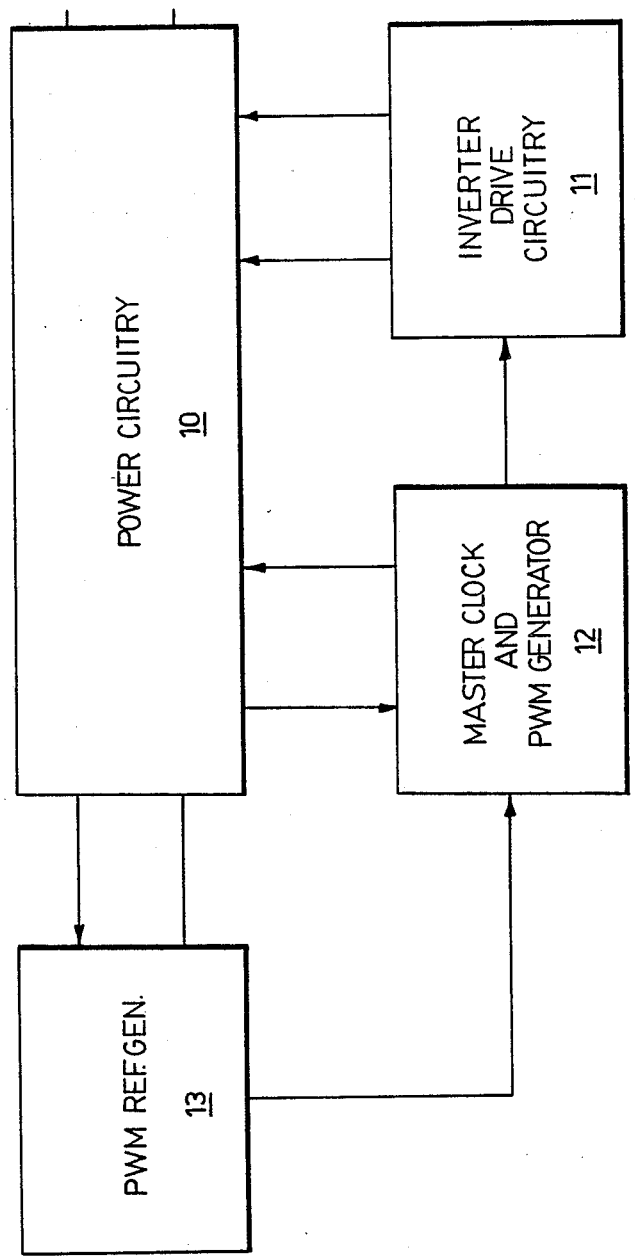
FIG. 1 is a block diagram showing the four principal sections of the power supply.

FIG. 1 is a block diagram of the power supply circuitry 10, which essentially comprises a rectifier feeding a bridge inverter via a switching element as hereinafter described, inverter drive circuitry 11, a master clock and PWM generator 12 providing control pulses both for the inverter drive circuitry 11 and the switching element of the power circuitry 10, and a PWM reference generator 13 to provide reference signals for control of the PWM generator of block 12.

Figure 3:
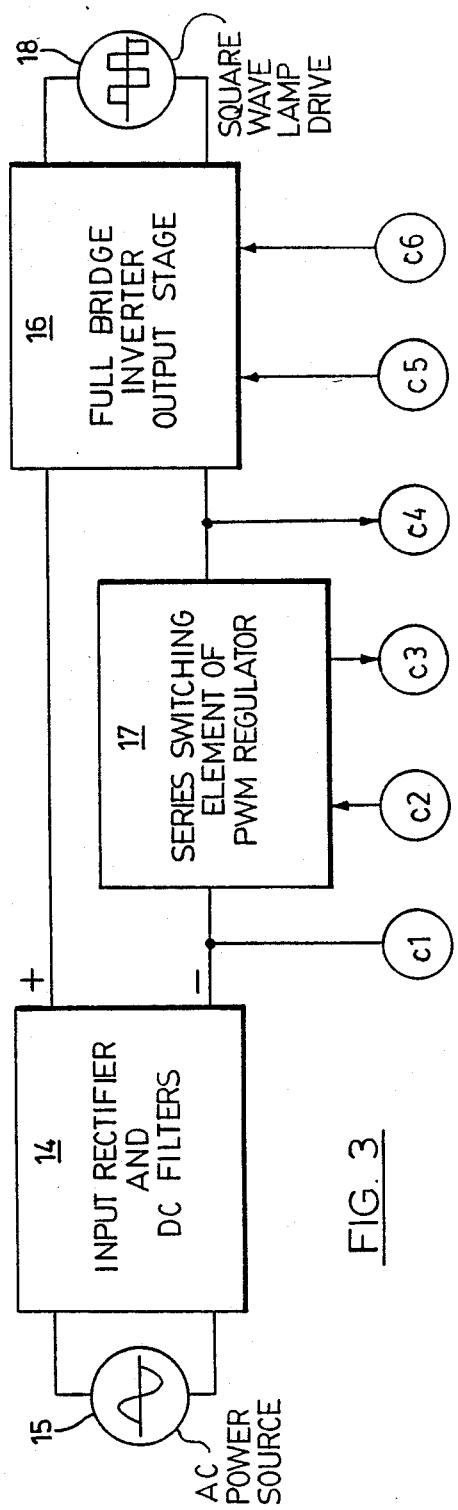
FIG. 3 is a schematic block diagram of the power circuitry, represented by a single block in FIG. 1.

A simplified block diagram of the power circuitry 10 is shown in FIG. 3. This comprises essentially an input rectifier with DC filters denoted by block 14, connected to an AC power source 15, the rectifier feeding a full bridge inverter 16 via a series switching element 17. The output of the bridge inverter consists of alternating square wave current pulses of equal duration for driving the arc lamp, as denoted by output 18. In FIG. 3 the symbols c1 . . . c6 denote interconnection with the control circuits for the power supply, as will be described subsequently.

Figure 2A:
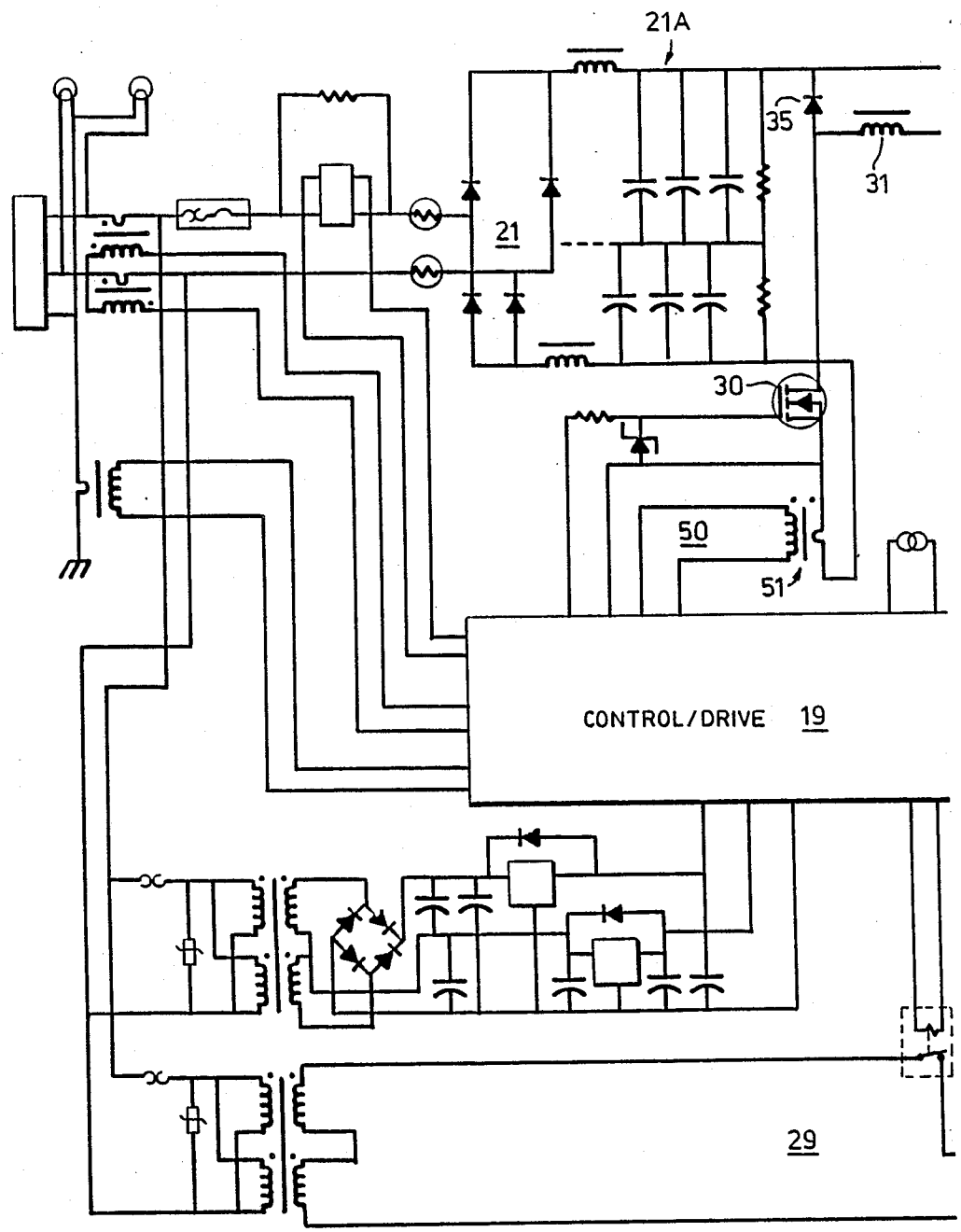
FIGS. 2a and 2b together form a detailed wiring diagram of the power supply.
Figure 2B:
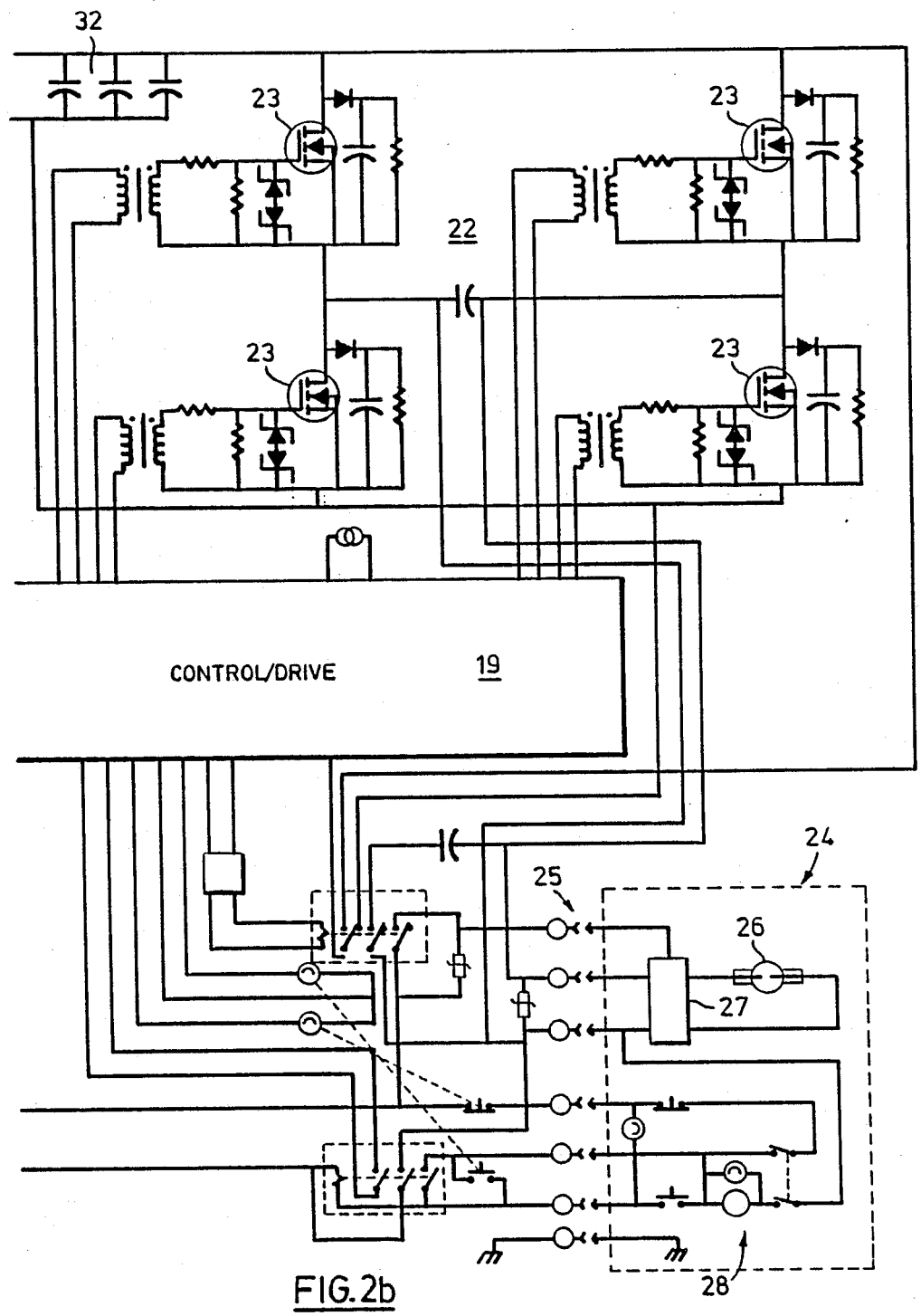

FIGS. 2a and 2b together show the power circuitry 10 in detail. In these figures the block 19, designated CONTROL/DRIVE, represents the control circuitry 11, 12 and 13 of FIG. 1, which will be described in greater detail hereinafter. Referring to FIGS. 2a and 2b, the power circuitry basically comprises a full wave bridge rectifier 21 with smoothing filters 20, energized from the AC power source 15. The rectifier 21 feeds an inverter 22. The inverter 22 comprises a bridge network of field effect transistors 23, which are driven by control pulses from the control/drive unit 19. The output of the inverter 22 is applied to the arc lamp unit 24, which is connected to the power supply via terminals 25. As shown, the arc lamp unit 24 comprises a metal halide lamp 26, a high voltage igniter 27, and additionally includes a conventional door interlock feature 28 which is interconnected with a supply circuit 29.

Current from the rectifier 21 is fed to the inverter 22 via a series circuit comprising a switching transistor 30, an inductor 31 and a capacitor 32, the inverter 22 being connected in parallel with the capacitor 32 so that current supplied by the rectifier 21 to the inverter is drawn through the switching transistor 30. The rectifier 35 is a free-wheel diode which maintains the flow of current through the inductor 31. The switching transistor 30, which constitutes the switching element of block 17 in FIG. 3, is itself a field effect transistor and is controlled by the control/drive unit 19 as hereinafter described.

Figure 5:
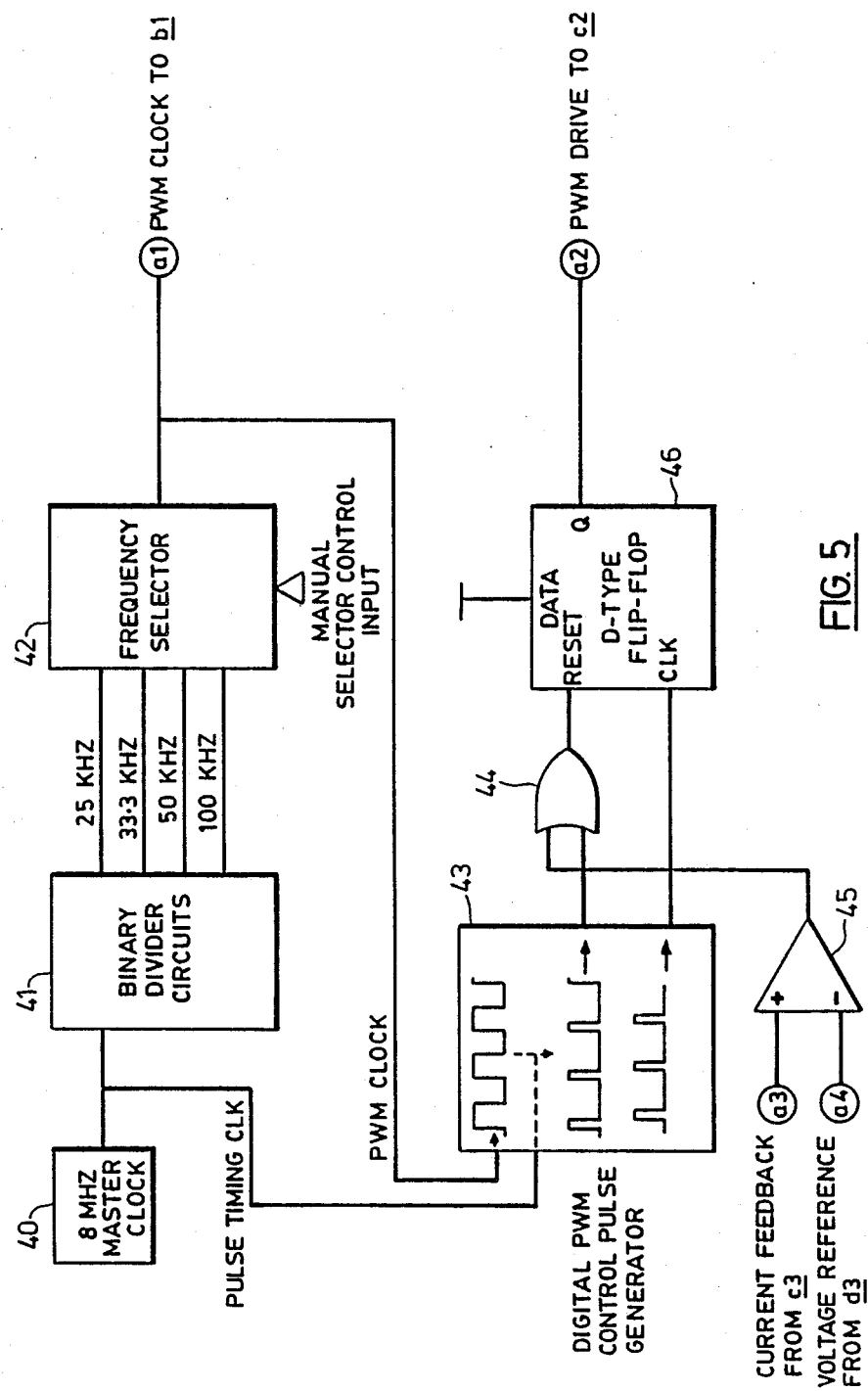
FIG. 5 is a schematic block diagram of the master clock and PWM generator, represented by a single block in FIG. 1.
Figure 7:
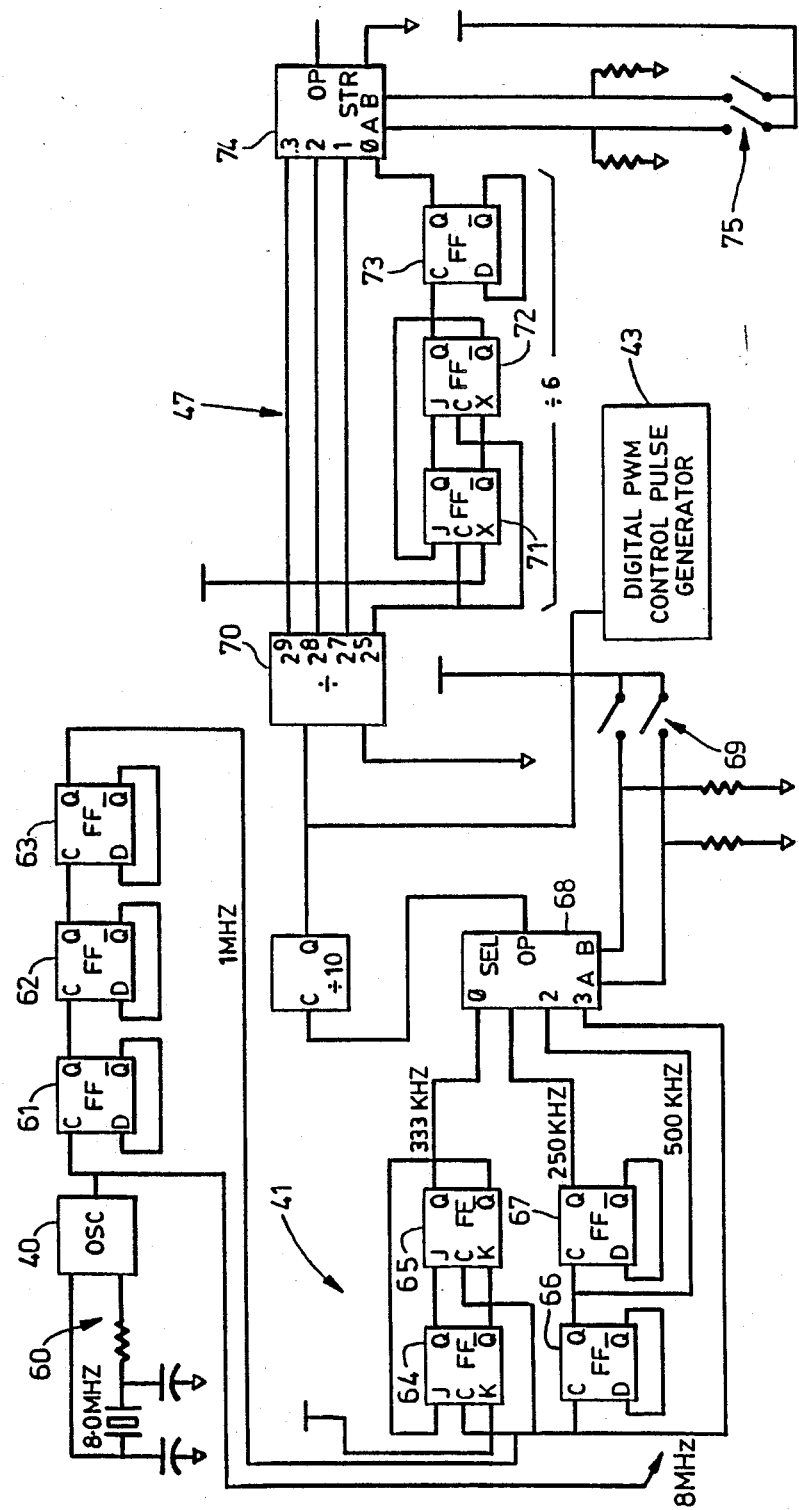
FIG. 7 is a timing diagram of the master clock and frequency selector circuits.

Referring now to FIG. 5, which shows the block 12 of FIG. 1 in greater detail, an 8 MHz master clock oscillator 40 provides a source of pulses from which control pulses for the switching transistor 30 and the bridge inverter 22 are derived. Binary divider circuits 41, which are shown in more detail in FIG. 7, are used to derive from the master clock frequency a sequence of square wave pulses at a frequency which can be selected manually by frequency selector 42. In the present example the divider circuits provide four discrete frequencies 25 kHz, 33.3 kHz, 50 kHz and 100 kHz. The selected sequence of square wave pulses at the chosen frequency provides a PWM clock for a digital PWM control pulse generator 43, and also a control for the bridge inverter 22 via connection a1.

The output from the pulse generator 43, at the PWM clock frequency, is gated by OR gate 44 with the output of a comparator 45 which compares a current-responsive first signal with a voltage-responsive second signal, as hereinafter described, to derive a difference signal. T is difference signal is applied to the reset input of a D-type flip-flop 46 and clocked at the PWM clock frequency to derive the PWM drive for the bridge inverter 22.

Figure 4:
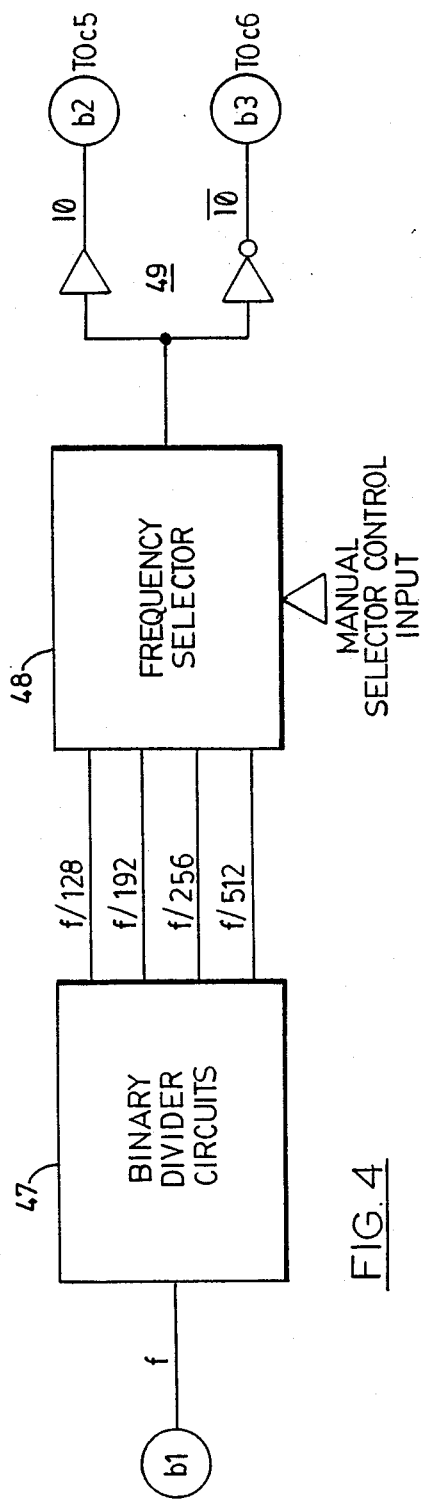
FIG. 4 is a schematic block diagram of the inverter drive circuitry, represented by a single block in FIG. 1.

Referring now to FIG. 4, the PWM clock signal from the binary divider 41 is applied via connection a1 (FIG. 5) and connection b1 (FIG. 4) to binary divider circuits 47, from which four discrete frequencies may be derived. These frequencies are f/128, f/192, f/256 and f/512, where f is the PWM clock frequency. The required one of the four frequencies is selected manually by a frequency selector unit 48 and applied to a buffer-/inverter pair 49, thereby deriving a pair of complementary sequences of square wave pulses at the selected frequency. The selected frequency is a submultiple of the PWM clock frequency. The complementary outputs constitute the drive for the bridge inverter 22, to which these outputs are applied via connections b2, b3 (FIG. 4) and c5, c6 (FIG. 3).

The current responsive signal applied to one input of the comparator 45, via connection a3 (FIG. 5) is a feedback signal derived from the switching element 17 FIG. 3) via connection c3. As shown in FIG. 2a, this feedback signal is derived from the current of the switching transistor 30 by a feedback circuit 50 including a current transformer 51.

The voltage-responsive signal, or voltage reference signal, applied to the other input of the comparator 45, via connection a4, is derived from the PWM reference generator 13 (FIG. 1). Specifically, this voltage corresponds to the voltage applied to the bridge inverter, which in the present example is nominally 300 volts. Thus the open circuit, or no load output from the PWM regulator is also 300 volts.

Figure 6:
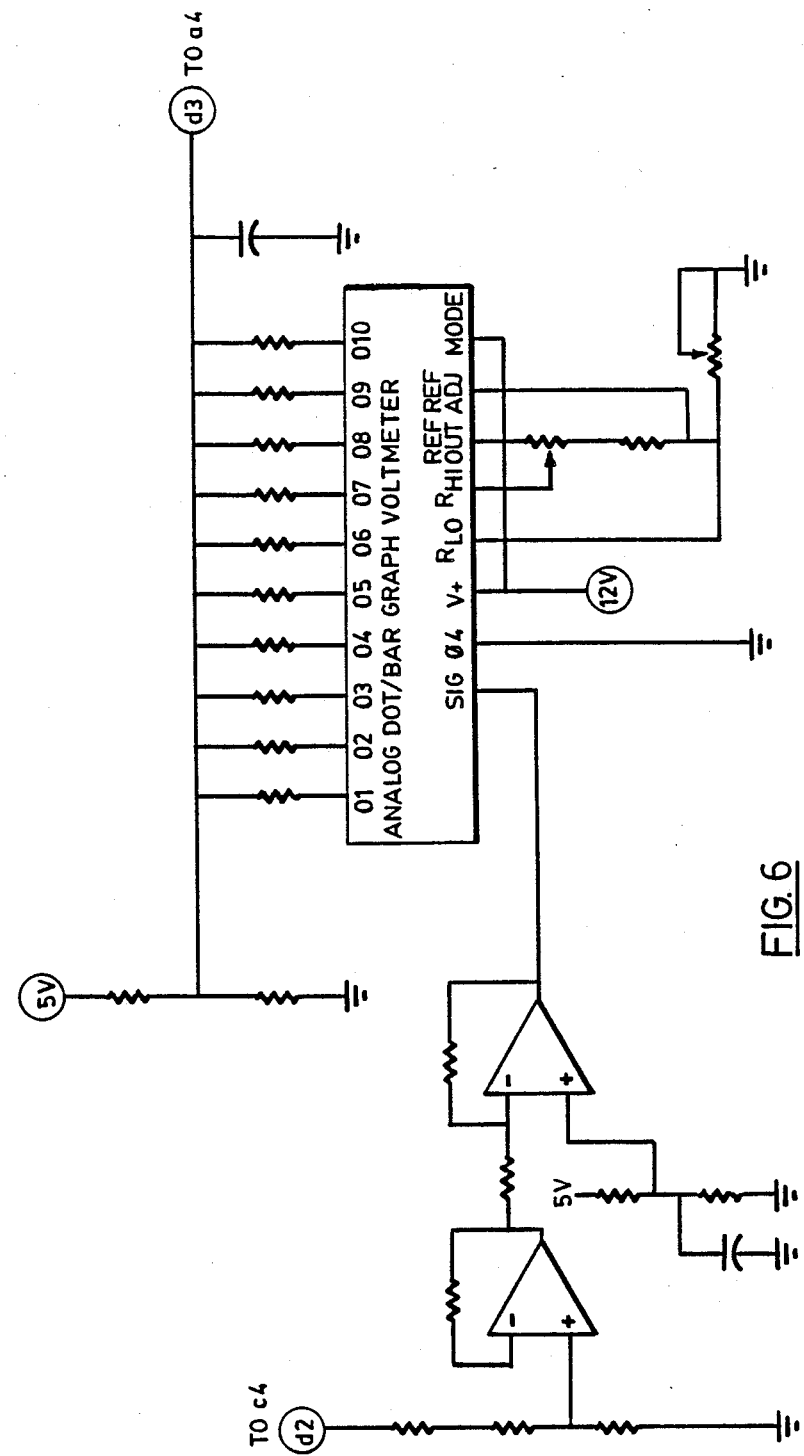
FIG. 6 is a schematic block diagram of the PWM reference generator, represented by a single block in FIG. 1.

Referring to FIG. 6, the voltage applied to the PWM reference generator via connection d2 will vary between 0 and 300 volts, the applied voltage being inversely proportional to the output voltage of the PWM regulator 17. This voltage is applied via a potential divider 52, which is designed so that the voltage at point A will vary in the range 0–5 volts in inverse ratio to the output voltage of the PWM regulator. The voltage at point A is applied to a unity-gain follower 53, which buffers this voltage from the input resistance of a unity-gain inverter 54. The output voltage of the inverter 54, at point B, therefore has a swing of 0–5 volts, being proportional to the output voltage of the PWM regulator.

The resultant voltage is applied to a dot/bar National Semiconductor, serving as an analog dot/bar voltmeter. This device consists of a comparator chain, a divider network, and a voltage reference circuit, the driver being used in BAR mode. The device will pull the outputs 01–010 LOW sequentially as the SIG input varies between the reference voltages R-LO and R-HI.

The reference voltage R-LO, at point E, is set to correspond to the voltage at point B when the low voltage end of the specified constant power range is reached at the PWM regulator output. The reference voltage R-HI, at point D, is set to correspond to the voltage at point b when the high voltage end of the constant power range is reached at the PWM regulator output.

At very low output voltages the feedback comparator reference to be applied via connections d3 and a4 to the comparator 45 (FIG. 5) is set exclusively by the potential divider 56. When the minimum normal operating voltage is reached, i.e. at the low voltage end of the specified constant power range, the output 01 of device 55 goes LOW, connection R3 in parallel with R2, and reducing the comparator reference voltage at point C. As the output voltage increases further, the outputs 02–010 are switched LOW in sequence, and therefore connect R4, R5 ... R12 sequentially in parallel with R2. In this way a constant power characteristic is effectively maintained by reducing the PWM output current in ten discrete steps as the output voltage increases through the normal operating range.

FIG. 7 is a simplified diagram of the timing circuits of FIGS. 4 and 5. The master oscillator 40 is crystal controlled, as indicated schematically by the tuning circuit 60, to provide an output frequency of 8 MHz. The output is applied to a chain of flip-flops 61, 62, 63 forming a frequency divider, to provide a 1 MHz output. The latter output is applied to the binary divider circuits 41 constituted by a group of flip-flops 64, 65, 66, 67 interconnected so as to derive four possible frequencies 25 kHz, 33.3 kHz, 50 kHz and 100 kHz. A multiplexer 68, controlled by manually operable selector switches 69, is used to select one of those frequencies thereby providing a sequence of square wave pulses at the first reference frequency previously referred to, (i.e. the PWM clock). The PWM clock is applied to the digital PWM control pulse generator 43, the output of which is processed as previously described to control the switching transistor 30.

The PWM clock is also applied to the further frequency divider circuits 47 comprising a binary divider 70, a chain of flip-flops 71, 72, 73, and a multiplexer 74. The arrangement provides four possible frequencies, each of which is a submultiple of the first reference frequency, and the required frequency is selected by manually operable switches 75 to provide a sequence of square wave pulses to be fed to the buffer/inverter pair 49 as previously described.

In the power supply arrangement described above with reference to FIGS. 1 to 7, a constant power output characteristic is obtained by using a direct voltage feedback means to control the output current threshold. However, in an alternative arrangement the PWM reference generator and its associated circuitry are modified as described with reference to FIGS. 8, 9 and 10 to provide a constant power output characteristic which is even simpler, more stable, and more precisely controllable than that described above.

It is common practice in many current-mode voltage regulator circuits to use an artificial ramp voltage to provide slope compensation. The ramp voltage is either summed positively with the current feedback signal, or summed negatively with a reference voltage. The usual purpose is to add a second pole to the loop response of the feedback circuit, which makes the PWM stable with duty factors greater then 0.5. It also keeps the average inductor current proportional to the peak inductor current over a wide range of duty cycles. The principle also applies to fixed frequency PWM voltage regulators designed to drive resistive loads. Thus, in a power supply according to the present invention it has been found that, by applying over-compensation by means of summing the artificial ramp with the current feedback signal, one cannot only achieve the benefits listed above for duty cycles in excess of 50%, but can also obtain a constant power output characteristic.

Figure 8:
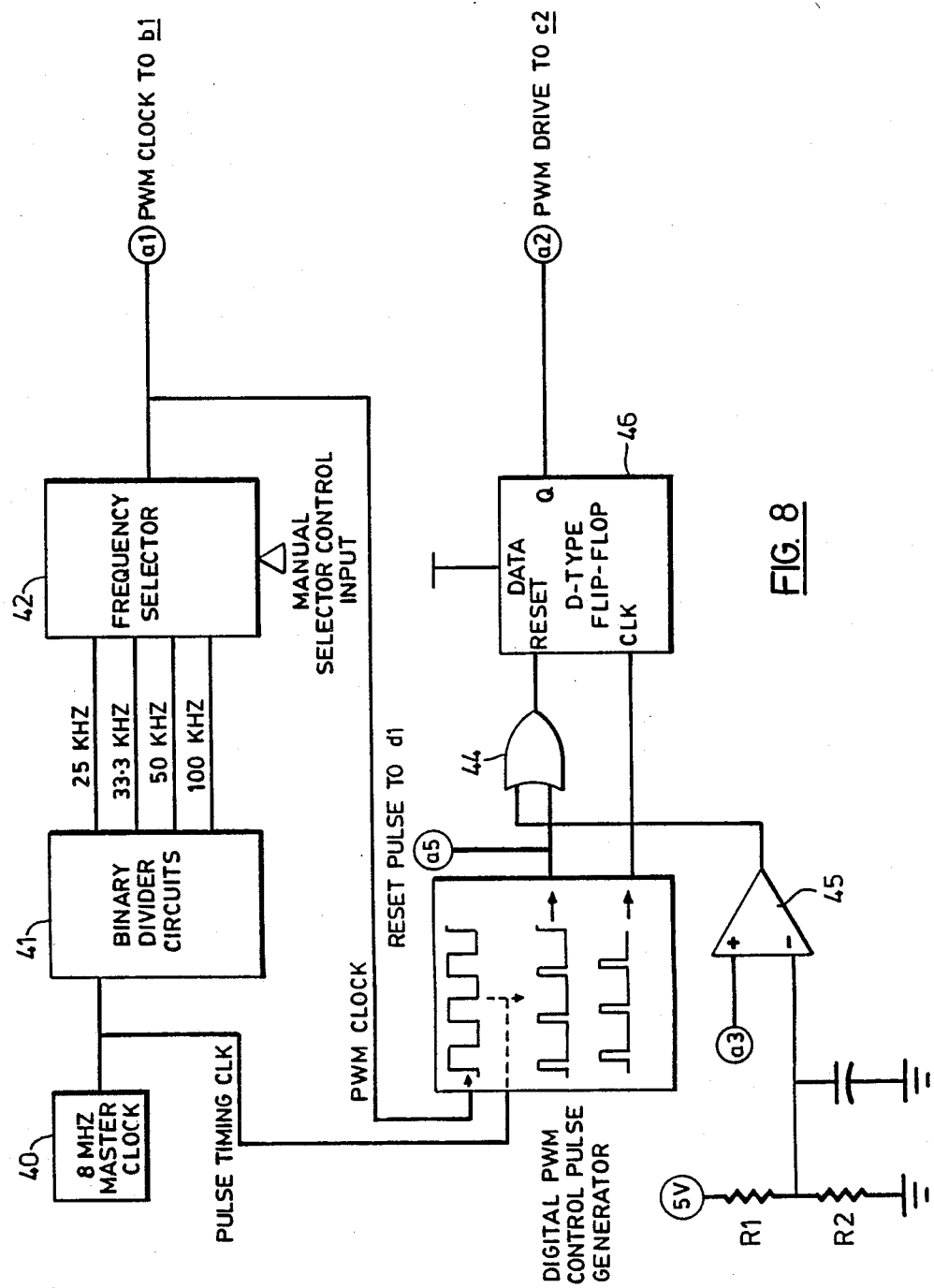
FIG. 8 is a schematic block diagram of the master clock and PWM generator, corresponding to the block 12 in FIG. 1, in a second embodiment of the invention.

FIG. 8 shows the master clock and PWM generator of this second embodiment of the invention. The diagram corresponds closely to that of FIG. 5 and corresponding components are denoted by the same reference numerals as are used in FIG. 5. However, in this case the reference source for the comparator 45 is a fixed voltage source derived from a potential divider $R_1$, $R_2$. The current feedback signal ($a_3$) is derived from the circuit shown in FIG. 9, which comprises essentially an artificial ramp generator 90, a voltage follower 91, and a summing network 92. The artificial ramp generator 90 comprises an RC network, shown as a resistance 93 or capacitance 94, with a FET 8 connected across the capacitance. The FET 80 rapidly discharges the capacitance 94 on each reset pulse ($d_1$).

The output of the ramp generator 90 is buffered by an operational amplifier 81 constituting the voltage follower 91, the buffered output being summed with a current feedback signal ($d_2$) from the series switching element 17 of the PWM regulator (FIG. 4). The output of the summing network 92 ($d_4$) defines the current feedback signal ($a_3$) to be applied to the non-inverting input of the comparator 45.

The waveforms representing the reset pulse ($d_1$) and the buffered output of the operational amplifier 81 ($d_5$) are shown in FIG. 10. It will be seen that the instantaneous voltage of the ramp waveform increases as the PWM ON-time, and hence the output voltage, increases, and so less current is required to reset the PWM as the voltage increases. Clearly, with such an arrangement, the values of the summing resistors 95, 96 of the summing network 92 can be selected to provide about a near perfect stepless constant power output characteristic over a wide range of operating voltages.

What I claim is:

1. A power supply for an arc lamp comprising a power source and an inverter, the power source comprising a rectifier, a capacitor, an inductor and a switching transistor connected in series, and the inverter comprising a bridge network of field effect transistors connected in parallel with the capacitor so that current supplied by the rectifier to the inverter is drawn through the switching transistor, timing circuit means for switching the field effect transistors of the bridge network in pairs whereby the inverter provides an output current of alternating square wave pulses of equal duration for driving the lamp, and PWM circuit means responsive both to current drawn by the switching transistor and voltage applied to the bridge network for controlling conduction of the switching transistor so as to maintain the output current of the inverter at a substantially constant power level, said timing circuit means comprising a master clock, means for deriving from the master clock a sequence of square wave pulses at a first selected reference frequency, and means for deriving from said sequence a pair of complementary sequences of square wave pulses at a second selected reference frequency which is a submultiple of the first for driving the field effect transistors of the inverter in pairs, and said PWM circuit means comprising a pulse generator controlled by the master clock for generating a sequence of control pulses at said first reference frequency, first feedback circuit means responsive to current draw by the switching transistor for deriving a current-responsive first signal, second feedback circuit means responsive to voltage applied to the bridge network for deriving a voltage-responsive second signal, comparator means for comparing said first an second signals to derive a difference signal, gating means for gating said control pulses with the difference signal to derive PWM pulses at said first reference frequency, and control circuit means for controlling the conduction of the switching transistor in a PWM mode in accordance with the derivation of said PWM pulses.

2. A power supply according to claim 1, wherein the switching transistor is a field effect transistor.

3. A power supply according to claim 2, wherein the second feedback circuit means includes an analog dot/bar graph voltmeter operable in the bar mode in response to voltage applied to the inverter, thereby to derive said voltage-responsive second signal.

4. A power supply for an arc lamp comprising a power source and an inverter,
the power source comprising a rectifier, a capacitor, an inductor and a switching transistor connected in series, and the inverter comprising a bridge network of field effect transistors connected in parallel with the capacitor so that current supplied by the rectifier to the inverter is drawn through the switching transistor,
timing circuit means for switching the field effect transistors of the bridge network in pairs whereby the inverter provides an output current of alternating square wave pulses of equal duration for driving the lamp, and
PWM circuit means responsive both to current drawn by the switching transistor and voltage applied to the bridge network for controlling conduction of the switching transistor so as to maintain he output current of the inverter at a substantially constant power level,
said timing circuit means comprising a master clock, means for deriving from the master clock a sequence of square wave pulses at a first selected reference frequency, and means for deriving from said sequence a pair of complementary sequences of square wave pulses at a second selected reference frequency which is a submultiple of the first for driving the field effect transistors of the inverters in pairs,
and said PWM circuit means comprising a pulse generator controlled by the master clock for generating a sequence of control pulses at said first reference frequency, feedback circuit means responsive to current drawn by the switching transistor for deriving a current-responsive first signal, means controlled in accordance with said sequence of control pulses for deriving a voltage-responsive second signal, summing circuit means for summing said first and second signals to derive a composite signal, comparator means for comparing said composite signal with a reference signal to derive a difference signal, gating means for gating said control pulses with the difference signal to derive PWM pulses at said first reference frequency, and control circuit means for controlling the conduction of the switching transistor in a PWM mode in accordance with the derivation of said PWM pulses.

5. A power supply according to claim 4, wherein the switching transistor is a field effect transistor.

6. A power supply according to claim 4, wherein said means for deriving a voltage-responsive second signal comprises a ramp generator, and circuit means responsive to said sequence of control pulses for cyclically resetting the ramp generator in accordance with the voltage applied to the bridge network.

7. A power supply according to claim 6, wherein the ramp generator comprises a resistance-capacitance charging circuit, a field effect transistor interconnected with the charging circuit for discharging same, circuit means for triggering the field effect transistor in accordance with said control pulses, and a voltage follower interconnected with the charging circuit for deriving a sawtooth ramp constituting said voltage-responsive second signal.

* * * * *